United States Patent [19]

Kramer et al.

[11] 4,353,615
[45] Oct. 12, 1982

[54] DYNAMIC MOUNTING FOR HOLOGRAPHIC SPINNERS

[75] Inventors: Charles J. Kramer, Pittsford; Alan F. McCarroll, Rochester, both of N.Y.; Tibor S. Fisli, Los Altos Hills, Calif.

[73] Assignee: Xerox Corporation, Stamford, Conn.

[21] Appl. No.: 180,215

[22] Filed: Aug. 21, 1980

Related U.S. Application Data

[63] Continuation of Ser. No. 921,411, Jul. 3, 1978, abandoned.

[51] Int. Cl.³ .............................................. G02B 5/32
[52] U.S. Cl. .................................. 350/3.71; 308/29; 308/72; 350/6.2; 350/6.7
[58] Field of Search .................. 350/3.7, 3.71, 6.2, 350/6.3, 6.7, 6.9, 320; 250/236; 308/29, 61, 72, 184 A, 191, DIG. 15

[56] References Cited

U.S. PATENT DOCUMENTS

| | | | |
|---|---|---|---|
| 3,208,805 | 9/1965 | Mayer | 308/29 |
| 3,795,768 | 3/1974 | Locke | 350/3.71 X |
| 3,866,986 | 2/1975 | Holper | 308/72 |
| 3,947,888 | 3/1976 | Jarsen | 360/103 |
| 3,949,919 | 4/1976 | Takei | 308/29 X |
| 3,953,105 | 4/1976 | Ih | 350/3.71 |
| 4,026,630 | 5/1977 | Wollenmann | 350/6.3 |
| 4,065,190 | 12/1977 | Hallerback | 308/72 X |
| 4,067,639 | 1/1978 | Kramer | 350/6.9 |
| 4,113,343 | 9/1978 | Pole et al. | 350/3.71 |
| 4,116,504 | 9/1978 | Cass | 308/72 |
| 4,124,257 | 11/1978 | Derner et al. | 308/72 X |
| 4,133,600 | 1/1979 | Russell et al. | 350/6.3 X |
| 4,239,326 | 12/1980 | Kramer | 350/3.71 |
| 4,243,293 | 1/1981 | Kramer | 350/3.71 |

FOREIGN PATENT DOCUMENTS 2264173 7/1973 Fed. Rep. of Germany ..... 350/3.71

OTHER PUBLICATIONS

Cindrich, "Image Scanning by Rotation of a Hologram", *Applied Optics*, vol. 6, No. 9, Sep. 1967, pp. 1531-1534.

McMahon et al., "Light Beam Deflection Using Holographic Scanning Techniques", *Applied Optics*, vol. 8, No. 2, Feb. 1969, pp. 399-402.

Primary Examiner—John D. Lee

[57] ABSTRACT

A holographic spinner is mounted to a drive motor via a center drive hub containing a self-aligning bearing. Rotational drive is coupled through to the spinner by one or more drive pins. This arrangement permits centrifugal forces of the spinner to perpendicularly align the spinner to the rotor axis while simultaneously maintaining disc centration and positive drive about the axis.

24 Claims, 6 Drawing Figures

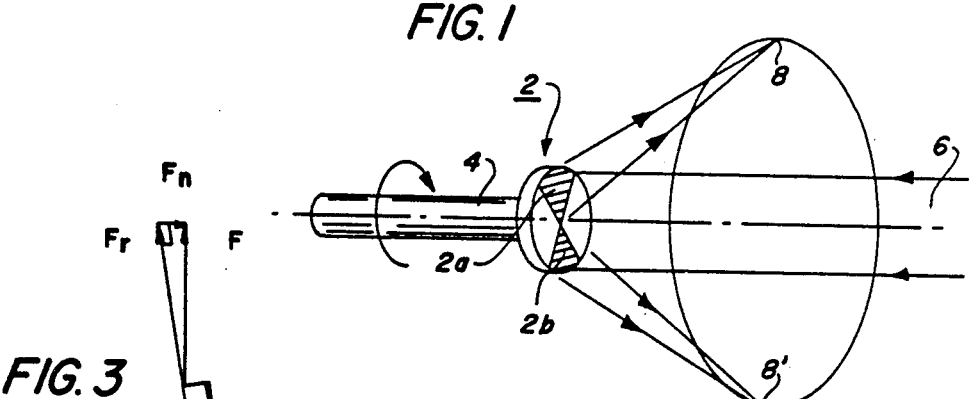
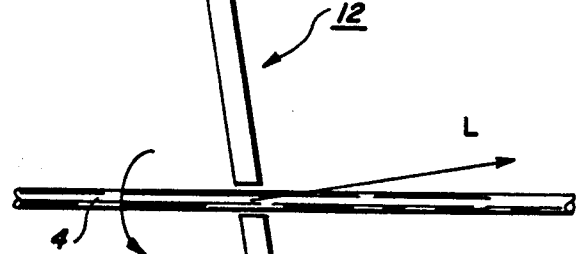
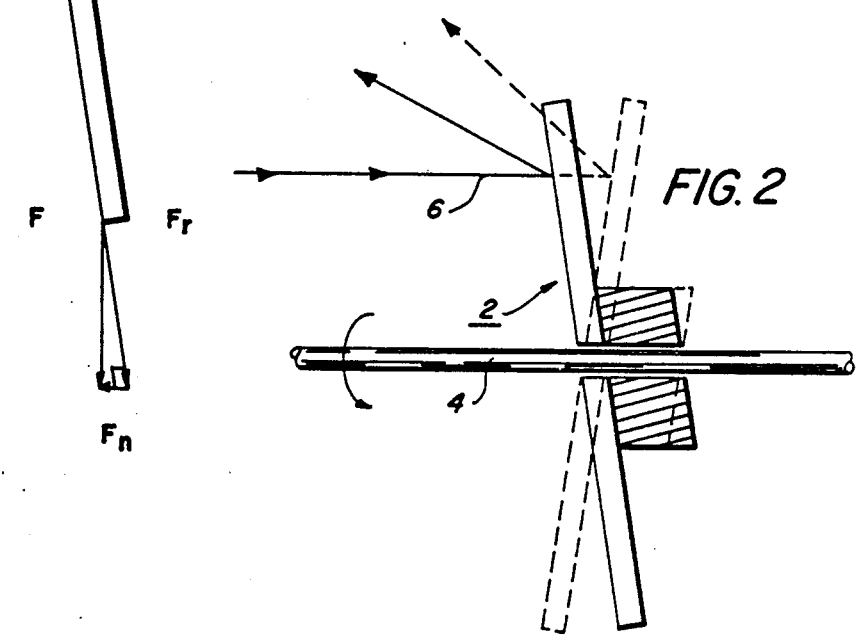

DYNAMIC MOUNTING FOR HOLOGRAPHIC SPINNERS

This is a continuation of application Ser. No. 921,411, filed July 3, 1978 (now abandoned).

BACKGROUND OF THE INVENTION

This invention relates to light spot scanning, and more particularly to scanning with the use of holographic optical elements.

The primary function of a scanning system is the controlled sampling, or restoration, of information. In an optical scanning system, the information is processed either in parallel by a light beam which can simultaneously illuminate many data sites, or sequentially by a beam which, due to its size, illuminates only a single data site at a time. Interest in sequential optical scanning has expanded in recent years primarily because of new capabilities provided by laser light. Laser scanners are capable of generating high resolution images at high scan rates. Most of the scanning systems devised to manipulate a laser beam include a galvanometer, rotating mirror, acousto-optic elements, or electro-optic elements as the light deflector. It was first demonstrated in 1967 that a rotating hologram can also serve as a deflector element in an image scanning system.

Laser line scanners used for imaging applications are generally required to generate a repetitive single scan line. A problem which has been encountered with multi-faceted rotating mirror line scanners is that due to the facet-to-facet nonuniformities and spinner wobble, non-collinear multiple scan lines are formed. An obvious solution to this problem is to fabricate the spinner assembly to such precise mechanical and optical tolerances that the residual error does not detract from the desired level of image quality. The expense of this approach, however, is a decided disadvantage. Holographic scanning provides an alternative by which this problem can be minimized.

In a typical arrangement for making a flat holographic spinner, a point light source serves as the object and a normally incident plane light wave as the reference beam. When a hologram thus constructed is illuminated with a plane light wave which is the conjugate of the original reference beam, the hologram functions to reconstruct a wavefront which converges with or without the use of additional optical elements, to form an image of the original point object light source. When the holographic spinner is then rotated about the axis of the reference beam, the reconstructed image spot scans a circle in space.

A problem exists in that, if the spinner is rigidly mounted to the rotating shaft but is not perpendicular to the shaft, mechanical wobble of the spinner creates a distorted reconstruction image and/or mechanical breakdown of the spinner. The elastomeric mounting technique disclosed in U.S. Pat. No. 4,067,639 provides significant improvement but causes the spinner to asymptotically approach the perpendicular position without fully reaching it and, hence, a small degree of wobble still exists.

It is an object of this invention to provide a holographic spinner which is free from mechanical wobble during rotation.

Another object is to provide a holographic spinner which freely rotates into a fully perpendicular position with respect to the axis of rotation.

Other objects, advantages and features of this invention may become apparent from the following more detailed description given in connection with the accompanying drawings.

DRAWINGS

FIG. 1 is a schematic illustration of a typical geometry for a holographic scanner.

FIG. 2 is a schematic illustration of a prior art rigidly mounted holographic spinner experiencing wobble.

FIG. 3 is a diagram of the centrifugal forces acting upon a spinning wheel such as the spinner of FIG. 2.

DESCRIPTION

Figure 5:
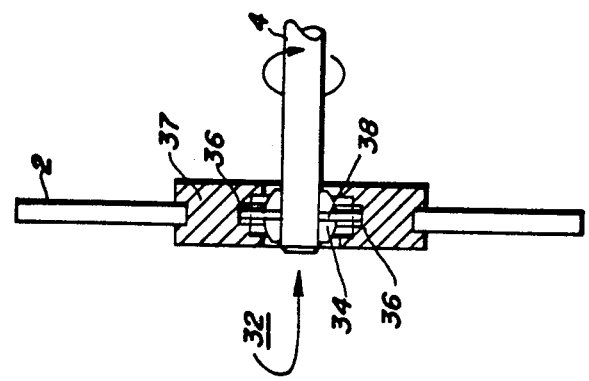
FIG. 5 is a cross-sectional view of a second spinner mounting arrangement.

Referring now to FIG. 1, a holographic spinner is shown at 2 mounted for rotation on shaft 4. Holographic spinner 2 as shown here is a reflection hologram and is disposed in the path of a reconstruction light beam 6 which reflects from the face of the hologram as a reconstruction of the original interfering wavefront to which the hologram was originally exposed. Thus, at any instant, an image of the original point source is reconstructed, and the locus of this reconstructed point source as the hologram is spun on the axis of shaft 4 is a circle in space. Two reconstruction points 8,8' are shown. As shown in FIG. 1, the spinner 2 can be sectioned into a plurality of "holographic facets" 2a, 2b which are analogous to the several facets of a polygon mirror scanner. Two such sections or "facets" are shown in FIG. 1, but this is only illustrative. There can be any number of such sections, subject to other limitations, such as the total scan angle required from each facet. Since these several facets are generated photographically on a single flat surface their imaging characteristics can be controlled to a high degree of precision with the result that facet-to-facet differences can be virtually eliminated. With facet-to-facet uniformity achieved, the major remaining element in the system which contributes to the multiple line image problem is mechanical wobble of the spinner element. The following description provides techniques for eliminating wobble in rotating spinners.

FIG. 2 shows an exaggerated view of what occurs when a holographic spinner element is rigidly mounted so that the plane containing the holographic facets periodically wobbles. The two views in FIG. 2 illustrate how a beam of light 6 is reflected from the hologram at two different positions of the spinner 2, 180° from each other in rotation. A prior art spinning element rigidly mounted in this fashion will maintain the same amplitude of wobble at all rotation rates until a sufficiently high rotation rate is reached where the spinner shatters or breaks loose from its mounting as a result of centrifugal force. Obviously, the reconstructed point source from such a hologram will define a wobbly circular locus in space, and a multi-faceted hologram will define a plurality of wobbly circular loci in space.

The forces acting on a rotating wheel are analyzed in FIG. 3 in which a rigid wheel 12 is shown rotating on the axis of shaft 4 with respect to which wheel 12 is somewhat tilted. As a consequence of the wheel 12 being tilted, its angular momentum vector, L, does not lie along the shaft axis 4 but precesses about it. The vector F in this Figure represents the total centrifugal force acting on a unit element of the wheel. Because of the wheel tilt, the vector F has a radial and a normal component, $F_r$ and $F_n$, respectively, with respect to wheel 12. The magnitude of the centrifugal force vectors are given by way of the following equations:

$$F = M W^2 r$$

$$F_r = F \cos \theta$$

$$F_n = F \sin \theta$$

Where M is the mass of a unit element, r is its radial distance from the center of rotation, W is the angular velocity of the wheel and $\theta$ is the angle between the normal to the wheel surface and the rotor axis.

As a result of the wheel symmetry, the $F_r$ forces are in a state of equilibrium, as long as they do not exceed the strength of the material, while the $F_n$ forces generate a torque which is normal to the sides of the wheel. If the wheel is rigidly mounted to the rotor this torque tries to bend the wheel since its magnitude increases with radial distance. If, on the other hand, the wheel is coupled to the rotor in a manner which permits some degree of movement, the torque will act to make the sides of the wheel perpendicular to the rotor axis. When this occurs, the $F_n$ vector reduces toward zero and the direction of the angular momentum vector L approaches the rotor axis.

Figure 6:
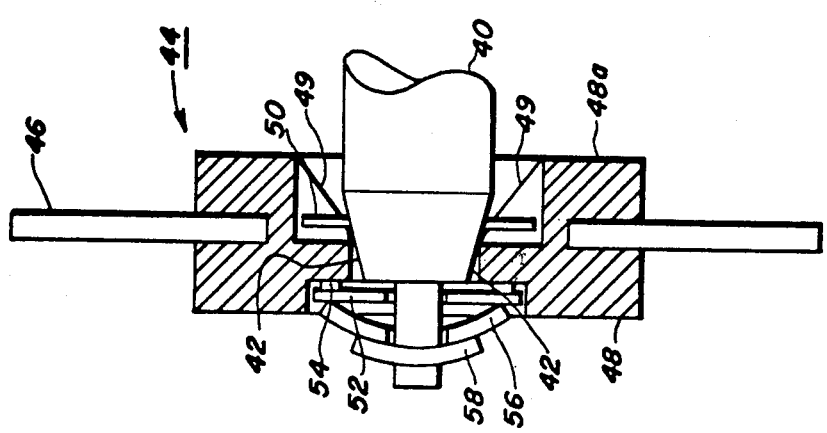
FIG. 6 is a cross-sectional view of a third spinner mounting arrangement.
Figure 4:
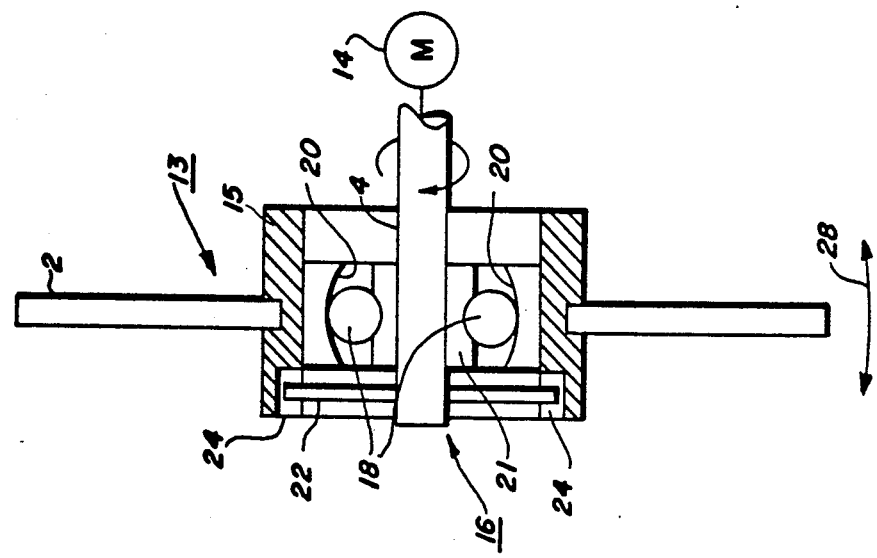
FIG. 4 is a cross-sectional view of a spinner mounting arrangement according to this invention.

In the present technique, the wobble in the holographic spinner 2 is completely eliminated by mounting the spinner on the rotor in the embodiments as illustrated in FIGS. 4, 5 and 6.

As shown in the cut-away side view of FIG. 4, motor 14 drives rotor 4 in the indicated rotational direction. Holographic spinner assembly 13, comprising spinner 2 and hub member 15 is linked to rotor 4 via a mounting assembly indicated generally as 16. The dimensions of this mounting assembly have been exaggerated in order to more clearly indicate its function. Assembly 16 comprises a plurality of self-aligning ball bearings 18 which freely rotate within the confines of spherical raceways 20 and seating element 21 which is fixedly attached to the shaft. Drive pin 22 is connected to member 15 by pin slots 24 and is also connected to rotor 4.

During operation, as the spinner rotates, drive pin 22 couples the spinner assembly to the rotor thereby synchronizing the angular velocity of spinner to rotor. The self-aligning ball bearing is essentially insensitive to the angular velocity at which the spinner assembly is driven and, therefore, does not rotate through 360°. It does, however, rotate to the extent that a partial transverse rotation is accomplished across the spherical surface of raceway 20. The bearing, therefore, permits the spinner assembly to function as a free swinging gimbal which allows the spinner assembly to rotate in the plane of the rotor as shown by arrows 28. In other words, the centrifugal forces ($F_n$ of FIG. 2) operate to align the spinner 2 precisely normal to the rotor axis 4. Further, if the outer and inner parts of assembly 16 are indexed in the playback mode to the same relative orientation they had during holographic spinner fabrication, the scanner system will be invariant with regard to any concentricity errors which may occur within the raceways of the bearing.

There are commercially available several self-aligning bearings which can be used in the fabrication of the system of FIG. 4. Examples are the DSP series manufactured by the Fafnir Ball Bearing Company.

FIG. 5 shows a cross-sectional view of a second mounting embodiment in which a spherical bearing is used in place of the self-aligning bearing of FIG. 4. In the figure, rotor 4 is again driven in the indicated rotational direction by a motor (not shown). Mounting assembly 32 comprises a spherical bearing 34 which is connected to guide slots 36 in hub member 37 by drive pin 38. In this embodiment, the drive pin is centralized to minimize drive torque vectors not parallel to the rotor shaft. Bearing 34 again provides a partial transverse motion the extent of which can be limited by appropriate selection of the transverse length of the guide slot 36. Spherical bearings of the LH BVV Series, manufactured by the Boston Gear Company, have been found suitable, after altering, to have one or more guide slots.

FIG. 6 is an alternate mounting configuration which allows the spinner asembly some degree of freedom to pivot in the plane of the rotor. In this embodiment, rotor 40 has a tapered end surface 42. Spinner assembly 44 consisting of spinner 46 and hub member 48 is linked to rotor 40 via a drive pin 50 located on tapered surface 42. Side 48A of member 48 is tapered inwardly so as to provide a curved surface 49 which abuts surface 42.

A flat spacing washer 52 is mounted to hub member 48 by rubber washer 54 and has an inner aperture diameter wider than the rotor shaft diameter. One or more spherical washer 56 is held in sliding contact against washer 52 by spherical retaining ring 58. Washer 56 and ring 58 thus form in effect, a ball joint assembly. In operation, as the spinner rotates about the axis, it is free to rock or pivot a short distance on the tapered portion of the rotor. This traverse motion is imparted via washers 52 and 54 to the spherical washer 56 which either slides against ring 58 or compresses washer 54 to accomodate the particular motion. As in the other embodiments, perpendicular alignment is achieved with the rotor. If desired, washers 52 and 54 may be eliminated in which case washer 56 would be in sliding contact with the surface of hub member 48. In either case, it would be desirable to apply a lubricant such as graphite or teflon at the points of sliding contact.

It has been demonstrated that a holographic spinner mounted to the rotor axis by the arrangements shown in FIGS. 4 through 6 is able to freely rotate to a position of perpendicular alignment with the rotor axis. The techniques disclosed completely eliminate the undesirable wobble of the spinner and greatly improve the scanning performance. The mounting techniques disclosed here could be used to eliminate the rotor wobble in a polygonal or multi-faceted mirror scanners.

In the embodiments shown in FIGS. 4, 5 and 6, it may be desirable to lock the spinners into their optimum state in order to avoid perturbations caused, for example, by externally applied forces (movement of machine housing, etc.). This is accomplished by rotating the spinner at its normal operating range until the desired position of perpendicular alignment is achieved. At this point a locking compound (silicone or epoxy) could be applied into the hub area and the constant velocity rotation continued until the compound has solidified locking the bearing into place. Depending on the type of compound, the application could be applied prior to rotating. It is evident that if this procedure is implemented, the drive pin would not be necessary. The drive pin can be eliminated completely provided the bearings are mounted in their respective raceways so that sufficient frictional forces are generated to achieve perpendicular alignment until the solidification technique is implemented. It is desirable that the shaft locking compound setup speed and the operating shaft speed should be the same.

What is claimed is:

1. A holographic scanning mechanism including:
   a rotatable shaft;
   a holographic spinner having on its surface at least one holographic facet;
   a hub assembly having a first member which is fixedly connected to said spinner and a second member which is located between said first member and said shaft, and said second member movable relative to said first member in a direction which is transverse to the plane of the shaft rotation;
   drive means for coupling the angular velocity of the shaft to the spinner; and
   means for rotating said shaft whereby during rotation the transverse movement of said second hub member permits the spinner to move in the same direction and achieve its optimum perpendicular alignment.

2. The holographic scanning mechanism of claim 1 wherein such second hub member is a spherical bearing assembly.

3. The holographic scanning mechanism of claim 1 wherein such second hub member is a plurality of ball bearings.

4. The scanning mechanism of claim 1 wherein said drive means is a locking compound applied to the surface of said second hub member prior to rotation, said compound selected to provide sufficient friction on application, to transmit the angular velocity of the shaft via said second hub member to the first hub member and, during rotation, to solidify so as to lock the spinner into its optimum perpendicular alignment.

5. The scanning mechanism of claim 1 wherein said drive means is a drive pin connected between the shaft and the first hub member.

6. A holographic scanning mechanism including:
   a rotatable shaft;
   a holographic spinner having on its surface at least one holographic facet, said spinner fixedly mounted onto a hub member;
   a drive element connected between said shaft and said hub member for transferring the angular velocity of the shaft to the hub member and hence to the spinner;
   a bearing means located in a generally spherical cavity between said hub member and said shaft, said bearing means adapted for movement within said cavity in a direction transverse to the plane of shaft rotation; and
   means for rotating said shaft whereby said hub member and spinner are rotated at the angular velocity of the shaft and are also rotated in a direction transverse to the plane of shaft rotation by action of said bearing means to achieve a condition of perpendicularity relative to the axis of rotation.

7. The scanning mechanism of claim 6 wherein said bearing means includes a plurality of ball bearings.

8. The scanning mechanism of claim 6 wherein said bearing means is a spherical bearing.

9. The scanning mechanism of claim 6 wherein said drive element is a locking compond inserted into the cavity area prior to rotation, said compound selected to provide sufficient friction, at application, to transmit the angular velocity of the shaft, through the bearing means to the hub assembly and during rotation, to solidify so as to lock the spinner into its optimum perpendicular alignment.

10. The scanning mechanism of claim 6 wherein said drive element is a drive pin connected between the shaft and the hub assembly.

11. The scanning mechanism of claim 10 further including a locking compound introduced during rotation, into the cavity area, said compound solidifying to lock the spinner into its optimum perpendicular alignment.

12. A holographic scanning mechanism including a rotatable shaft having a tapered end surface;
   a holographic spinner assembly having at least one holographic facet;
   drive means for connecting the angular velocity of the shaft to the spinner; and
   a spherical, stiffly compressible assembly mounted in sliding contact with said spinner assembly whereby said spinner, under the influence of centrifugal force slidably pivots about a point on said tapered surface, saidcompressible assembly transfers the force of said pivoting motion and aligns the spinner into a condition of uniform perpendicularity relative to its axis of rotation.

13. The scanning mechanism of claim 12 wherein said compressible assembly further includes a spherical washer mounted in sliding contact with said spinner assembly, said washer providing the limited amount of movement required to accommodate the pivoting transverse movement of the spinner assembly.

14. The scanning mechanism of claim 12 wherein said drive means is a drive pin located on the tapered end surface of said shaft.

15. A light spot scanning mechanism including a rotatable shaft;
   a mirrored light scan element having on its surface at least one facet;
   a hub assembly having a first member which is fixedly connected to said scan element and a second member which is movably positioned between said first member and said shaft, said second member movable in a direction which is transverse to the plane of shaft rotation;
   drive means for connecting the angular velocity of the shaft to the scan element; and
   means for rotating the shaft whereby during rotation, the transverse movement of said second hub member permits the scan element to move in the same direction and achieve its optimum perpendicular alignment.

16. A light spot scanning mechanism according to claim 15 where said second member is a spherical bearing assembly.

17. A light spot scanning mechanism according to claim 15 wherein said drive means is a locking compound applied to the surface of said second hub member prior to rotation, said compound selected to provide sufficient friction on application, to transmit the angular velocity of the shaft via said second hub member to the first hub member and, during rotation, to solidify so as to lock the scan element into its optimum perpendicular alignment.

18. In a light spot scanning assembly which includes a rotatable light spot scan element mounted to a rotatable shaft, a scan element alignment assembly connecting said scan element to said shaft, said alignment assembly comprising:
- drive means for coupling the angular velocity of the rotating shaft to said scan element; and
- a bearing assembly having a first element fixedly connected to said shaft and rotating therewith and a second, bearing, element adapted to provide a motion, during rotation, to said scan element in a direction transverse to said shaft rotation whereby said scan element aligns itself in a direction perpendicular to said rotating shaft.

19. The scanning assembly of claim 18 wherein such second bearing element is a spherical bearing.

20. The scanning assembly of claim 18 wherein such second bearing element is a plurality of ball bearings.

21. The scanning assembly of claim 18 wherein said drive means is a locking compound applied to the surface of said second bearing element prior to rotation.

22. The scanning assembly of claim 18 wherein said drive means is a drive pin connected between the shaft and the scan element.

23. The scanning assembly of claim 18 wherein said scan element is a multi-faceted polygon scanner.

24. The scanning assembly of claim 18 wherein said scan element is a holographic spinner having at least one holographic facet disposed for rotation with said shaft.

* * * * *